Jan. 27, 1959     B. L. KNAPP     2,871,108
APPARATUS FOR SEPARATING SOLID-LIQUID-GAS MIXTURES
Filed Nov. 18, 1955
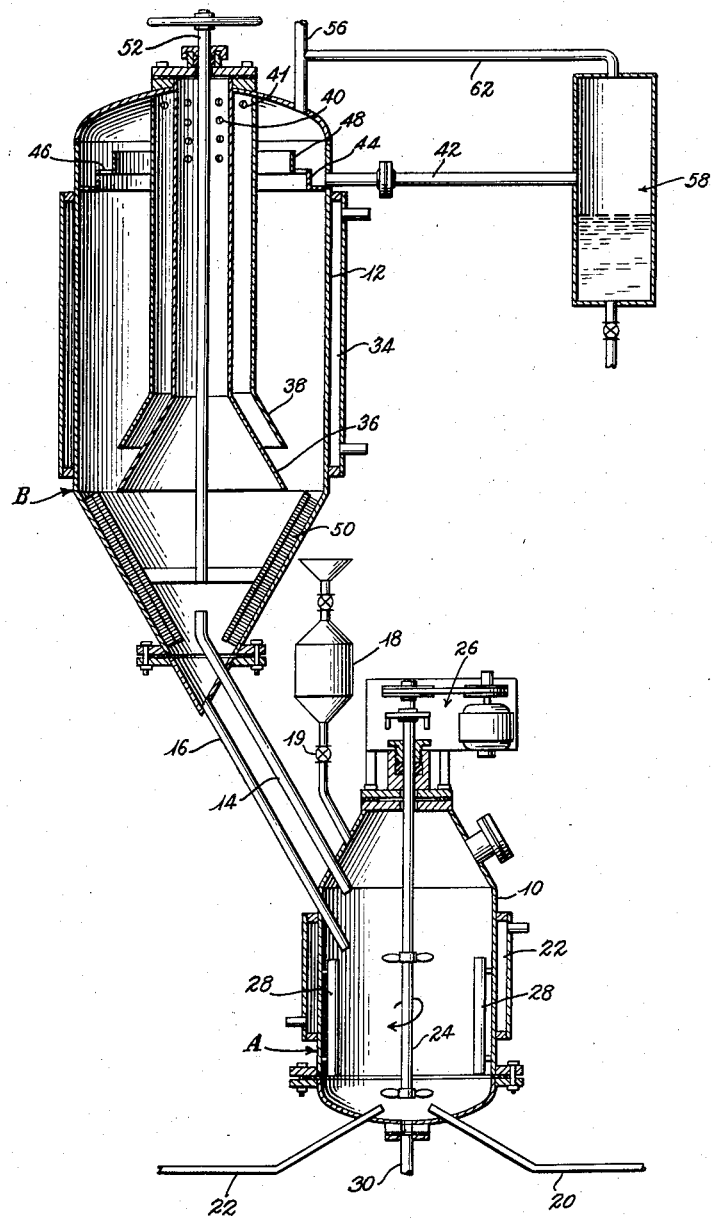
INVENTOR.
*Bernard L. Knapp*
BY
*Thornton F Holder*
ATTORNEY

United States Patent Office 2,871,108
Patented Jan. 27, 1959

2,871,108

APPARATUS FOR SEPARATING SOLID-LIQUID-GAS MIXTURES

Bernard L. Knapp, Painesville, Ohio, assignor to Diamond Alkali Company, Cleveland, Ohio, a corporation of Delaware Application November 18, 1955, Serial No. 547,785

3 Claims. (Cl. 23—288)

This invention relates to a new apparatus for conducting solid-liquid and solid-liquid-gas-contacting operations. More particularly, the invention relates to such operations wherein it is desired to separate the solid in either the two or three-phase system and recycle it in the process and, in the case of the three-phase system, to separate also the gas.

Since the apparatus of the invention is concerned with manipulatory aspects of process operations, as noted above, it will be understood that the invention is not restricted in its application by the end result to be accomplished by any particular process; rather, the invention is concerned with the physical aspects of handling and separating solids, liquids, and gases generally. Thus, the invention is applicable to processes such as decolorizing, deodorizing and other similar liquid-treating processes wherein the object is to treat the liquid with a solid, subdivided body of material and thereafter to take off the treated liquid as the product and recycle the solid material for use in treatment of additional liquid. Additionally, and further exemplary of the scope of the invention, the invention is applicable to catalytic reactions generally wherein a solid particulate mass is employed.

The apparatus of the invention is useful in processes whether they be batch or continuous and the invention may be employed regardless of pressure conditions which are required by particular processes. For convenience herein, the invention is described in relation to a catalytic reaction wherein a solid, subdivided material is suspended in the liquid as a slurry, and the slurry is treated with an excess of gaseous material to effect chemical alteration of the liquid, the excess gas and solid thereafter being separated from the reaction products with recovery of the gas and return of the solid material for further use in the catalytic reaction. This is a general type of reaction of which there are many known examples.

In processes of the type mentioned immediately above, the catalyst is maintained in suspension in the slurry in a reaction chamber by suitable agitation and as the reaction goes to completion products are drawn from the reaction chamber and advanced to a settling zone where the suspended catalyst is separated and reused in the continuing reaction. In such processes it is customary to employ a catalyst pump for the purpose of returning the separated catalyst to the reaction zone. Such return pumps are of various types and are well-known to the art. Generally, they are expensive and require frequent replacement due to abrasive effects of the solid material. Additionally, some operations are of such nature that they require an intermittent operation for the return of the catalyst. In such cases, expensive valves are necessary for holding and feeding the catalyst at the proper time; they also require frequent replacement.

A further difficulty that is encountered in carrying out liquid-solid catalytic reactions of the type under discussion arises because of the necessity of knowing and maintaining a particular liquid level in the reaction chamber. In order to accomplish this, instruments sensing the level and affording information concerning it are necessary adjuncts of the apparatus and, where the liquid level is subject to fluctuation, it is necessary that steps be included in the methods for the purpose of adjusting the level to the proper point. Accordingly, these are other aspects of the methods and apparatus now employed because of lack of suitable means by which they may be eliminated.

It will be seen from the foregoing that methods and apparatus which are utilized in this type of reaction employ steps in the methods and elements in the apparatus which desirably should be eliminated.

It is an object of the present invention to provide a method and apparatus wherein the disadvantages of the methods and apparatus employed in the prior processes are eliminated.

A further object of the invention is to provide a simple, economical, integrated apparatus, including a process zone and settling zone, and a method for conducting contacting processes therein, which method and apparatus shall be adapted for continuous processing, continuous separation of solids and gases and continuous return of solids to the process, without the aid of special mechanical circulating means for effecting transfer of the materials of the process between the said zones.

A further object of the invention is to provide an apparatus of the character described in the immediately preceding paragraph which, at the same time, is so arranged and adapted as to maintain automatically a prescribed or predetermined liquid level in the process zone which does not vary from the predetermined or prescribed level at any time during the on-stream period for the process.

These and other objects will be observed by those skilled in the art as the description of the apparatus of the invention is revealed in the following paragraphs.

As noted above, for convenience, the invention is described herein in relation to a chemical process. Accordingly, the apparatus now to be described is appropriately referred to in chemical terminology, it being understood that the invention is not limited in consequence thereof.

In the drawings, the figure is a view in side elevation of the apparatus elements of the invention, the single view being in cross-section.

Referring to the drawings, reaction chamber A and settling chamber B have sidewalls 10 and 12, respectively. The two chambers are interconnected for circulation of reactants and catalyst by means of conduit 14 and conduit 16, the reactants passing upwardly into the settling chamber through conduit 14 and the slurry of settled catalyst returning to the reaction chamber through conduit 16, the lower end of which is suitably somewhat lower than the lower end of conduit 14 for a purpose to be described.

Catalyst hopper 18 has a suitably valved feed leg 19 leading to the reaction chamber by which fresh catalyst may suitably be delivered to the reaction zone. Inlet means 20 and 22 are provided for the reactants. Agitator 24 mounted in chamber A may be driven at any prescribed speed and by any suitable means, such means being shown generally at 26. Baffling means 28 are positioned on the interior of the reaction chamber and, as will be understood by those skilled in the art, cooperate with the agitator to effect the desired intermixture of catalyst and reactants. Outlet 30 normally is used only at such time as it is desired to withdraw the contents of the reaction chamber. Jacket 32 surrounds the exterior of the reaction chamber and suitably contains heat exchange medium that may be necessary in some applications of the method and apparatus of the invention.

Referring to the detail of the settling chamber, it will be seen that the chamber is provided with a conicallyshaped lower end which, at its apex, joins with the return conduit 16. As in the case of the reaction chamber, the settler is provided with a suitable jacket 34, for the purpose of receiving heat exchange medium.

Arranged centrally of the settling chamber are two funnel-shaped receivers 36 and 38 which, as shown, are inverted and positioned one within the other and fixed by any suitable means to the top wall of the settling chamber. At their upper ends, these members are perforated as at 40, 41, the former for passage of partially settled liquid and the latter for passage of gas. As will be noted, the two funnel-shaped members provide an annular space between their respective walls, the purpose for which space will become more apparent when the operation of the method in relation to the apparatus is described hereinafter. Outlet conduit 42 is provided for removal of treated reactants.

Positioned just below conduit 42 is an annular channel or launder ring 44 which, as seen in the drawings, is L-shaped in cross-section. Ring 44 is fixed to the interior of the settling chamber and extends the full circumference thereof. Positioned inside channel 44 and suitably fixed thereto as by brackets 46 is annulus 48 which extends below the top of ring 44 and serves as a baffle ring or stilling baffle. It will be understood from the description presented hereinafter that liquid overflows the wall of channel 44, thus reaching outlet conduit 42.

Rake 50 mounted upon shaft 52, extends to the outside of the settling chamber and is provided with suitable means for rotating at such time as may be desired or necessary.

Gas vent 56 is valved in any suitable manner so as to maintain suitable pressure in the system.

Surge chamber 58 is mounted to receive the products of the reaction delivered through conduit 42. Line 62 interconnects the surge chamber with vent line 56 whereby equal pressure may be maintained between chamber B and 58. In order to maintain a steady flow of liquid from the settling chamber to chamber 58, the liquid level in chamber 58 is suitably maintained below the point of inlet of liquid thereto.

As indicated above, the apparatus and method of this invention is applicable to a wide variety of chemical reactions and from this it follows that the invention is not limited to use in any particular reaction.

The operation of the method of the invention may now be considered in conjunction with exemplary apparatus. For this purpose, the method and apparatus of the invention are described in relation to the treatment of caustic soda solutions for the purpose of removing sodium chlorate therefrom. Sodium chlorate is an undesirable impurity in caustic soda solutions and one method of treating such caustic for the purpose of removing sodium chlorate involves treating the contaminated caustic with hydrogen in the presence of a hydrogenating catalyst. A suitable catalyst for this purpose is the well-known Raney nickel catalyst. The reaction is known to those skilled in the art and, therefore, will not be described in complete detail in connection with the present invention but, rather, only so much as may be necessary to explain the method and operation of the invention.

The reaction may suitably be carried out at a temperature above about 300° F. and at a reaction pressure of about 150 p. s. i. g.

In carrying out this or other similar reactions according to the method and in the apparatus of the present invention, the size of the apparatus, of course, will bear some relation to the materials to be reacted. In general, however, the apparatus is selected as to size so as to allow the reaction proper to take place in about the lower two-thirds of the zone where it is to be expected that the agitation apparatus will be most effective in maintaining the catalyst in suspension in the mixture. Accordingly, the level of the reaction mixture is so chosen and the conduits 14 and 16 interconnecting the reaction chamber and the settling chamber are located in relation to the chosen liquid level. Establishing a preferred liquid level is further related to flow rates to and from the reactor to the end that a prescribed residence time will be provided during which the body of caustic in the reaction chamber is exposed to the treatment.

The method is practiced in the apparatus of the drawing by initially charging caustic soda solution to be purified and catalyst to the reaction chamber A. Thereupon hydrogen is introduced through inlet 20 at the operating pressure and caustic liquor to be treated is continuously introduced through inlet 22, also at the operating pressure. The temperature in the reaction zone is established by circulation of heat exchange fluid at a suitable temperature through the jacket 32. During operation the agitator 24 is continuously run to provide desired gas-liquid-solid mixture.

Sufficient hydrogen is employed to provide an excess over that necessary for reaction at the operating pressure in the non-liquid filled upper area of reaction chamber A. In normal operation the lower end of the conduit 14 contacts the liquid surface established as a vortex by agitation in reaction chamber A. Ideally, the end of conduit 14 is partially submerged at the liquid level and due to the pressure of the hydrogen in the gas filled area the conduit 14 tends to pick up a mixture of liquid entrained catalyst and hydrogen, the hydrogen providing the lifting force to drive this mixture through conduit 14 into the chamber B. The gas-liquid-solid mixture proceeds upwardly into receiver 36 and as it proceeds, the gas becoming separated from the mixture tends to escape from the receiver 36 through holes 40. As the mixture loses gas, it becomes heavier and its upward progress is thus impaired even though some liquor may escape through the holes 40 into the intermediate annular area between the receiver 36 and receiver 38. The flow in this annular area is generally downward as the mixture has been substantially relieved of its entraining hydrogen. As the flow continues downwardly, the catalyst particles tend to settle out rapidly so that upon reaching the bottom of the receiver 38, the catalyst particles continue downwardly while the catalyst-denuded caustic soda solution can circulate at will in the area outside of the funnel 38.

As the liquid level is maintained in normal operation below the top of annulus 48 but above the top of ring 44, the gas- and catalyst-denuded caustic soda solution which has had its chlorate removed in the chamber A tends to flow over the edge of ring 44 into the annular area connected to the conduit 42 and is collected in the chamber 58.

In the meantime catalyst which has settled out in the chamber B settles down the cone-shaped portion of the chamber where it is prevented from adhering to the sides by rake 50 and returns ultimately to the chamber A through the line 16, the entire flow through the system being maintained by the heavier material flowing downwardly through conduit 16 as against the lighter gas entrained material flowing upwardly through the conduit 14.

While there have been described various embodiments of the invention, the methods and apparatus described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. An apparatus for forming solid-liquid-gas phase mixtures and separating the components of said mixtures, comprising in combination an enclosed chamber having means for introducing gas, liquid, and solid phases thereinto, said chamber being in fluid connection with a vessel adapted for separation of solid-liquid-gas phases, said vessel being positioned above said chamber and having a pair of vertically disposed, and concentrically arranged open-end conduits therein spaced from the bottom thereof, the inner of said conduits having means providing for fluid flow therefrom to the annulus between said conduits, the outer of said conduits being in fluid communication with separate means for withdrawing gas from said vessel, means for withdrawing a portion of the liquid phase from said vessel at a level therein below that at which gas is withdrawn therefrom and above the lower termini of said conduits, the fluid connections between said chamber and said vessel comprising a first passageway opening into said vessel below the inner of said conduits therein, and a second passageway the openings thereof into said vessel and said chamber being positioned below those of said first passageway, and means for imposing a gas pressure in said chamber whereby the liquid level therein is maintained substantially at the opening of said first passageway and in said vessel above the level of said conduit for removing a portion of the liquid phase therefrom.

2. An apparatus for forming solid-liquid-gas mixtures and separating components of said mixtures, comprising in combination an enclosed chamber adapted for the formation of solid-liquid-gas mixtures, and an enclosed vessel positioned superjacent said chamber in fluid connection therewith and adapted to separate gas and liquid phases, and a portion of the liquid phase from the solid phase, said chamber having means for introducing gas, liquid, and solid phases thereinto, means for effecting solid-liquid-gas interspersion within said chamber, said vessel having vertically disposed concentrically arranged conduits therein, the lower termini of said conduits opening into said vessel above the bottom thereof, the inner of said conduits having means adapted for fluid flow to the annulus between said conduits, the outer of said conduits being in fluid communication with separate means for withdrawing gas from said vessel above said means for fluid flow from said inner conduit to said annulus, and means for removing a portion of the liquid phase from said vessel positioned below said means for removing gas therefrom and above the lower termini of said conduits, said fluid communication between said chamber and said vessel comprising a first passageway opening into said chamber above the level of said means for introducing gas and liquid thereinto and opening into said vessel below the lower termini of said conduits therein, a second passageway opening into both said chamber and said vessel at a level in each lower than the openings of said first passageway therein, and means for imposing a gas pressure in said chamber whereby the liquid level in said chamber is maintained substantially at the opening of said first passageway thereinto and in said vessel substantially at the level of said conduit for removing a portion of the liquid phase therefrom.

3. An apparatus for forming solid-liquid-gas mixtures and separating the components of such mixtures, comprising in combination an enclosed chamber adapted for the formation of solid-liquid-gas mixtures, and an enclosed vessel positioned superjacent to said chamber in fluid connection therewith and adapted to separate gas and liquid phases and a portion of the liquid phase from the solid phase, said chamber having means near the bottom thereof for introducing gas and liquid phases thereinto, means to introduce a solid phase into said chamber, means providing agitation to effect solid-liquid-gas interspersion into said chamber, said vessel having a pair of vertically disposed concentrically arranged conduits depending from the top of said vessel, their upper termini being closed thereby, the lower termini of said conduits opening into said vessel above the bottom thereof, the inner of said conduits having perforations in the upper portion thereof which are in fluid communication with the annulus formed between said conduits, the outer of said conduits having perforations in the uppermost portion thereof above said perforations of said inner conduit, means in the upper portion of said vessel for removing gas therefrom, and means for removing a portion of the liquid phase from said vessel positioned below said means for removing gas therefrom, said fluid communication between said chamber and said vessel comprising a first passageway opening into said chamber above the level of said means for introducing gas and liquid thereinto and opening into said vessel below the open-end of said inner conduit therein, a second passageway opening into both said chamber and said vessel at a level in each lower than the openings of said first passageway therein, and means for impossing a gas pressure in said chamber whereby the liquid level therein is maintained substantially at the opening of said first passageway thereinto, and in said vessel substantially above the means for withdrawing a portion of the liquid phase therefrom.

References Cited in the file of this patent
UNITED STATES PATENTS

| | | |
|---|---|---|
| 1,027,022 | Whiteley | May 21, 1912 |
| 1,862,243 | Strindlund | June 7, 1932 |
| 2,361,283 | Good | Oct. 24, 1944 |
| 2,408,721 | Altsheler | Oct. 8, 1946 |
| 2,520,957 | Peterson | Sept. 5, 1950 |